G. H. WORRALL.
ROTARY SCREEN.
APPLICATION FILED MAY 19, 1911.
1,041,935.
Patented Oct. 22, 1912.
3 SHEETS—SHEET 1.
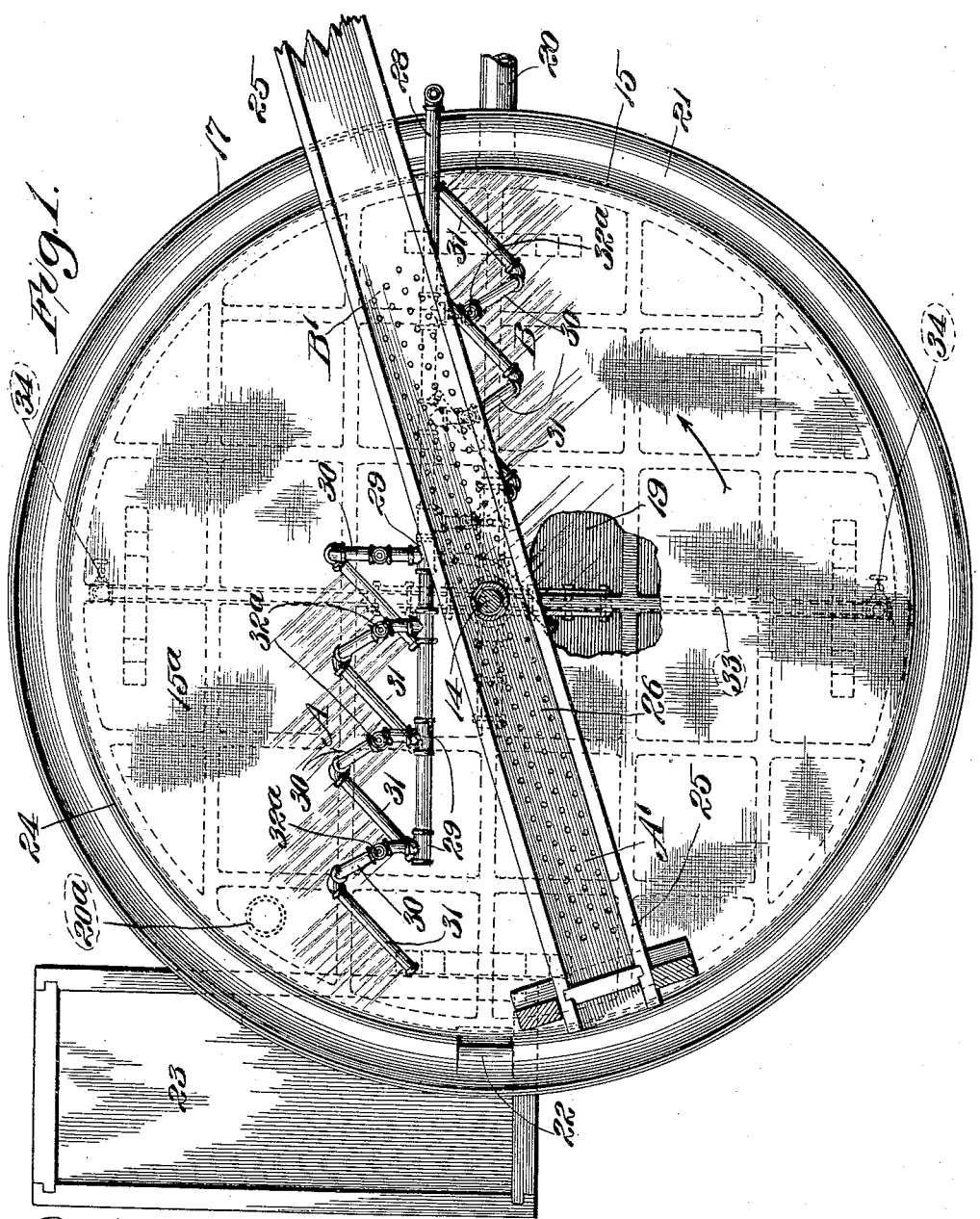
Attest:
W. H. Scott
Henry M. Hertel
Inventor:
George H. Worrall,
By John H. Bruninga,
Atty.

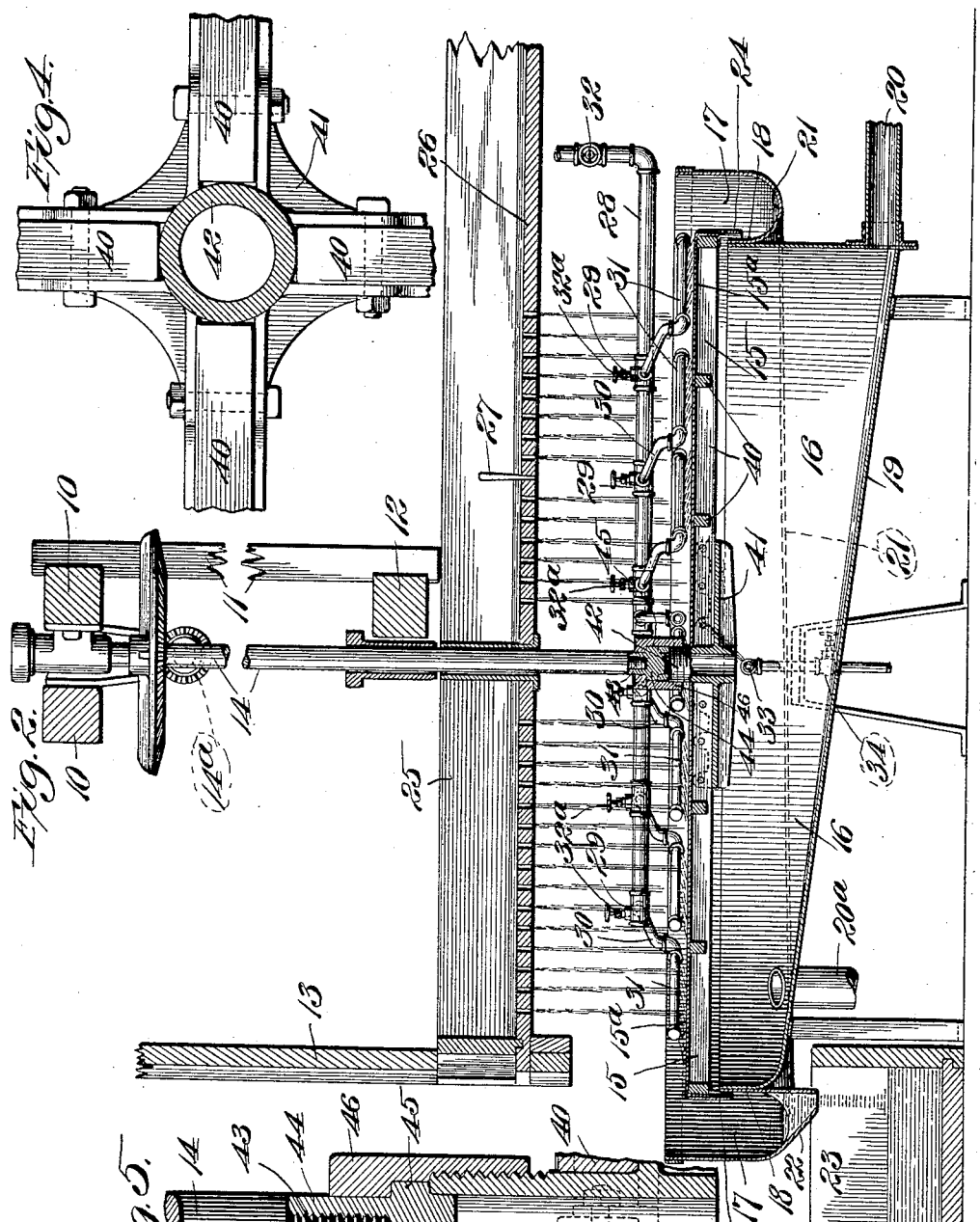

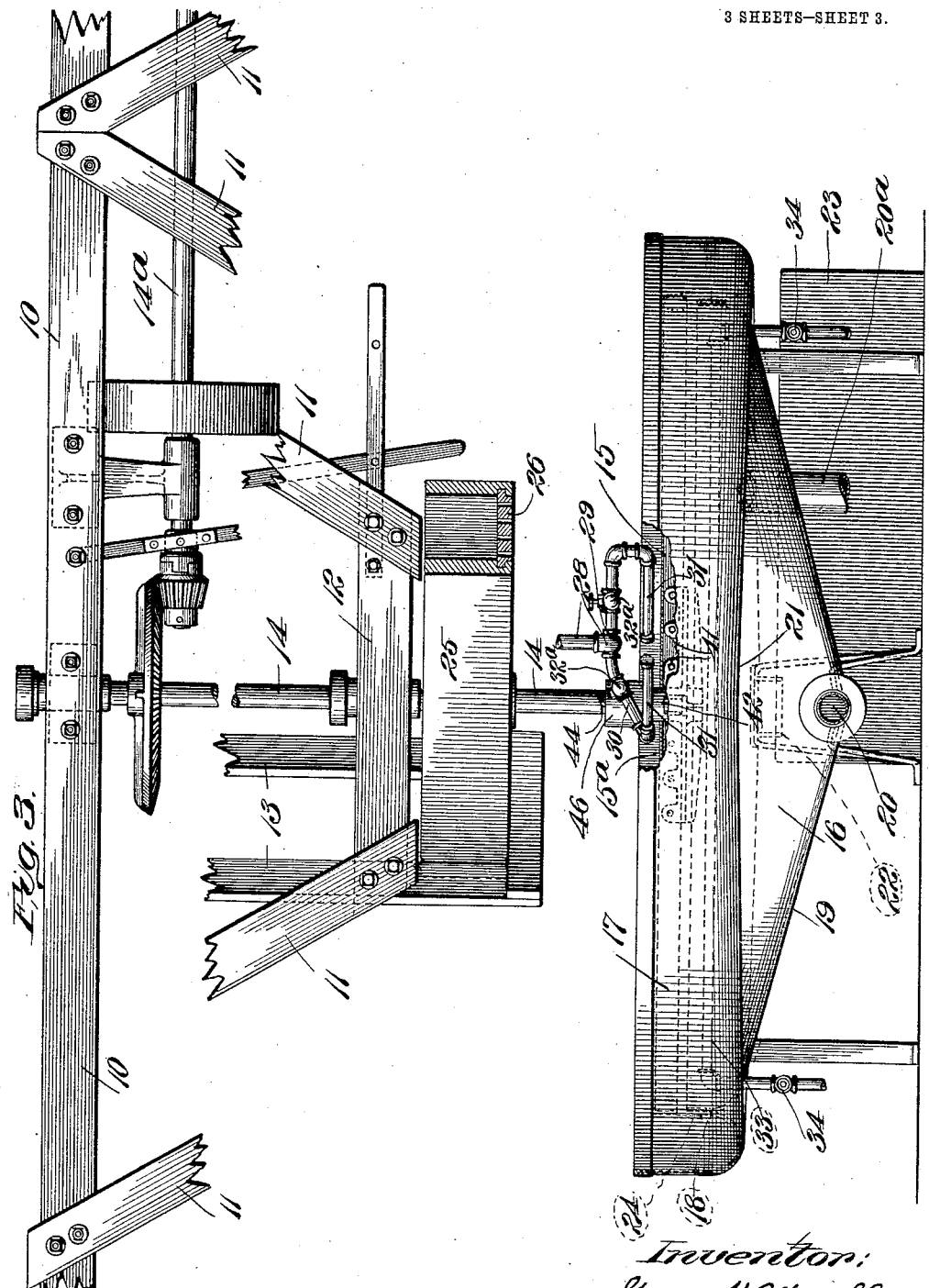

UNITED STATES PATENT OFFICE.

GEORGE H. WORRALL, OF KIRKWOOD, MISSOURI, ASSIGNOR TO NATIONAL LEAD COMPANY, OF ST. LOUIS, MISSOURI, A CORPORATION OF NEW JERSEY.

ROTARY SCREEN.

1,041,935.  Specification of Letters Patent.  Patented Oct. 22, 1912.

Application filed May 19, 1911. Serial No. 628,308.

*To all whom it may concern:*

Be it known that I, GEORGE H. WORRALL, a citizen of the United States, and residing at Kirkwood, State of Missouri, have invented certain new and useful Improvements in Rotary Screens, of which the following is a specification.

This invention relates to screens, and more especially to screens which are adapted to separate fine and ground materials by screening through cloth. The screen is especially adapted in the manufacture of white lead for separating the converted material which is to form the finished product from the residue. In such separation the material is ground fine and passed with water through a screen of silk cloth of fine mesh. In view of the fineness of the product and of the screen mesh, difficulty has been experienced due to the clogging of the screen which rendered the operation slow. In prior constructions the proportion of screen surface actually utilized was moreover very low.

The objects of this invention are to construct a screen which will screen finely ground substances, which will have a large capacity compared to its size, and which will not clog up.

Further objects are to improve the screen as to details, and to arrange it so that the screen table can be easily taken out of the machine, and further objects will appear from the detail description taken in connection with the accompanying drawings in which:

Figure 1 is a plan of a screen embodying this invention, Fig. 2 is a vertical section, Fig. 3 is an elevation from the right-hand side of the machine, Fig. 1, Fig. 4 is a detail of the spider, and Fig. 5 is a vertical section showing the connection between the supporting and driving shaft and the table.

The screen generally stated consists of a rotary screen table covered with screening material. A receiver is arranged below the screen table and is adapted to receive the material passed through the screen, the material being fed on the table from a suitable feed box or trough located above the same. A circular trough surrounds the table at its outer edge and connects with a suitable discharge. The material dropped on the table is subjected to jets of water, and these jets have a radial or outward action to spread the material over the screen surface, force the residue to the outside edge of the table into the trough, and wash and clean the screen surface. A water jet is also arranged to be directed on the table from below so as to prevent clogging. The table is connected to its supporting and driving shaft in such a manner that it can be easily disconnected therefrom without requiring dismantling of the shaft.

Referring to the accompanying drawings, 10, 11, 12 and 13 designate the members of a supporting frame work. A main shaft 14$^a$ is arranged to drive a vertical supporting and driving shaft 14 which is arranged to be connected and disconnected by a suitable clutch. The shaft 14 supports at its lower end a rotary table 15 consisting of a suitable frame work and provided with a covering 15$^a$ of fine mesh screening material such as silk.

A casing, preferably of sheet metal, is arranged to form a plurality of receivers for receiving the separated parts of the material from the table, and is supported in any suitable manner as shown. An inner receiver or pan 16 circular in form is located below the table, and the outside walls thereof extend to the outside edge of the table. A circular annular receiver or trough 17 surrounds the inner receiver and the table, and is supported from the inner receiver forming a division wall 18 projecting upwardly to nearly the edge of the table. The bottom 19 of the inner receiver inclines toward the discharge outlet 20 so that the material will drain off. The bottom 21 of the trough is inclined in a reverse, direction and toward the opposite side of the machine, and at its lowest point is provided with a discharge outlet 22 discharging into a suitable receptacle 23. An overflow pipe 20$^a$ is provided for the inner receiver to prevent the material in the inner receiver from overflowing into the trough. A curtain 24 secured to the edge of the table hangs or laps over the edge 18 and prevents the dross passing off the edge of the table from flowing into the inner receiver.

A feed box or trough 25 is supported from the frame member 13, and delivers the material to the table, the bottom 26 of this trough being provided with perforations for this purpose. The trough extends diametrically across the table and is arranged to deliver the material over substantially its entire surface, and removable plugs 27 may be provided to regulate the feed.

A water supply pipe 28 extends across the table and is provided with a number of T's 29 for connection with branch pipes 30 having connected perforated jet members 30 arranged to direct jets of water on the upper face of the table. The jet members 31 are arranged in groups A and B on opposite sides of the shaft as shown in Fig. 1, so as to direct the jets of water under pressure at an angle on the upper face of the table, and in a direction toward the edge of the table. The supply of water to pipe 28 can be regulated by a suitable valve 32, and the supply to the individual jets can be individually controlled by valves 32$^a$. Another water pipe 33 extends crosswise of 28 and underneath the table and is perforated to direct a jet of water under pressure against the under surface of the table, and the supply may be controlled by suitable valves 34.

The frame work of the table is preferably made of light material such as wood, and comprises frame members 40 and a rim, supported by a metal spider 41 which is provided with a threaded hub 42. The shaft 14 is provided with a threaded portion 43 arranged to receive a sleeve 44 provided with an enlarged head 45. A sleeve 46 slips over the head 45 and is arranged to be threaded on the hub 42. The above construction forms a union joint connection between the shaft and table, and it will be seen that the table can be quickly removed from the shaft 14 by unscrewing the sleeve 46 from the hub 42, and this does not require any considerable vertical movement of the table. The sleeve 46 is of square or hexagonal construction so as to be easily operated by a wrench.

In the operation of this machine the material fed into the trough 25 drops on the screen, and is spread over its surface as it revolves, the material being fed with water. The jets of water directed on the upper face of the table have a spreading action. As the material drops on the screen surface it will be successively subjected to the jets from the center toward the edge as the table revolves. This will spread the material from the center outwardly over the table and toward and over the edge and carry the fine material through the screen. The residue will pass outwardly toward the edge of the table and will be discharged into the trough, and the finished product will pass through the screen and into the central receiver. The jets directed on the upper face of the table do not only spread the material over the screen, but also keep the surface clean. As the table revolves in a counter-clockwise direction as shown by the arrow, Fig. 1, the screening surface will be subjected to the jets A on the left-hand side before it will reach the left-hand end A' of the feed trough, and will be subjected to jets B before reaching B'. The screen surface will thus be subjected to the jets and washed clean before more new material is deposited thereon. A clean open screen surface will thus always be presented to the new material. This increases the screening efficiency of the surface, since the material as spread over the entire surface will be washed, thereby enabling the entire screen surface to be in action at all times. The trough extends practically completely across the screen surface and spreads the material over the entire surface. The space factor, $i.\ e.$, the ratio of the space to the capacity, will therefore be low. The jets directed against the lower face of the table beat back the particles which have lodged in the screen meshes and thus keep these meshes open, thereby effectually preventing clogging. The top jets therefore act to spread the material over the screen, wash the same so that a clean surface will be presented to the new material, and wash the residue over the edge into the trough, while the bottom jets act to prevent clogging of the screen surface.

The valves 32$^a$ are arranged to be independently controlled so as to independently control the pressure of the separate jets. This is desirable, in view of the fact that since the surface velocity will increase from the center toward the edge of the table, and since the deposit is practically uniform from the center to the edge, the force of the jets must increase from the edge toward the center. In this way the jets will act to spread the material uniformly over the table.

The machine is so constructed that the parts are accessible for control, operation and repair, and the table can be readily removed by means of the union joint construction without requiring the dismantling of the driving and supporting shaft. This is especially advantageous in view of the fact that the clearance between the table and the receivers is necessarily small.

While this invention is particularly useful for screening white lead, it is not limited to such application but may be used on various materials. It is further obvious that various changes may be made in the details of construction without departing from this invention, and it is therefore to be understood that this invention is not to be limited to the specific construction shown and described.

Having thus described the invention what is claimed is:

1. In a screen, the combination of a rotary screen table having a screening surface of fine mesh for screening wet pulverulent material of the consistency of white lead, a receiver arranged below the screen table and adapted to receive the material passed therethrough, a circular trough extending below the edge of the table and surrounding the same and adapted to receive the material discharged over the edge thereof, and means for directing water on said table to spread the material over its screen surface and toward its edge and carry the material through the screen.

2. In a screen, the combination of a rotary screen table having a screening surface of fine mesh for screening wet pulverulent material of the consistency of white lead, means for feeding the material on said table, a receiver arranged below said table and adapted to receive the material passed therethrough, a receiver extending around said table and adapted to receive the material discharged over the edge thereof, and a water pipe constructed and arranged to direct a jet of water on the screen surface of said table as the table revolves and at a point circumferentially in advance of the feeding means, for the purpose set forth.

3. In a screen, the combination of a rotary screen table having a screening surface of fine mesh for screening wet pulverulent material of the consistency of white lead, means for feeding the material across said table, a receiver arranged below said table and adapted to receive the material passed therethrough, a receiver extending around said table and adapted to receive the material discharged over the edge thereof, a water pipe extending across the table, and a plurality of branches extending from said pipe and adapted to direct jets of water on the upper surface of said table in advance of the feeding means and in a direction toward the outer edge of the table to spread the material over its screen surface and toward its edges.

4. In a screen, the combination of a rotary screen table having a screening surface of fine mesh, means for feeding the material on said table, a receiver arranged below said table and adapted to receive the material passed therethrough, a receiver extending around said table and adapted to receive the material discharged over the edge thereof, and means for directing jets of water on said table at a plurality of points around said table to spread the material over the screen surface as the table revolves.

5. In a screen, the combination of a rotary screen table having a screening surface of fine mesh for screening wet pulverulent material of the consistency of white lead, means for feeding the material on said table, a receiver arranged below said table and adapted to receive the material passed therethrough, a receiver extending around said table and adapted to receive the material discharged over the edge thereof, a water pipe constructed and arranged to direct a jet of water on the screen surface of said table circumferentially in advance of the feeding means, and a water pipe extending below and across said table and adapted to direct jets against the lower surface thereof.

6. In a screen, the combination of a rotary screen table having a screening surface of fine mesh, and a feed trough extending above and across the table and adapted to feed the material thereon and over substantially its entire screen surface as the table revolves.

7. In a screen, the combination of a rotary screen table having a screening surface of fine mesh, means extending radially of said table for feeding the material over its screen surface as the table revolves, and means for washing the screen table in advance of the feed thereon.

8. In a screen, the combination of a rotary screen table having a screening surface of fine mesh, a feed trough extending diametrically across the table and adapted to feed the material over its screen surface as the table revolves, and water jets in advance of said feed trough.

9. In a screen, the combination of a rotary screen table, means for feeding the material on the screen surface of said table, a water pipe extending across said table in a direction from the center of said table toward its edge, and having a plurality of jets constructed to direct streams on said table, and valves constructed to control the pressures of the streams as delivered by said jets, whereby the streams may be delivered on said table at variable pressures decreasing from the center of said table toward its edge.

10. In a screen, a rotary screen table suspended above a receiver, said table comprising a frame for the screening material, a spider for supporting said frame and having an exteriorly threaded hub above said table, and a driving and suspending shaft having a detachable threaded connection with said hub.

In testimony whereof I affix my signature in presence of two witnesses.

GEORGE H. WORRALL.

Witnesses:
 FRANKLIN MILLER,
 J. H. BRUNINGA.

Copies of this patent may be obtained for five cents each, by addressing the "Commissioner of Patents, Washington, D. C."